US008045219B2

(12) United States Patent
Pruden et al.

(10) Patent No.: US 8,045,219 B2
(45) Date of Patent: Oct. 25, 2011

(54) PRINTED MEDIA PRODUCTS INCLUDING DATA FILES PROVIDED IN MULTIPLE LAYERS OF ENCODED, COLORED DOTS

(75) Inventors: Benny J. Pruden, Brownstown, PA (US); Peter W. LeMasters, Columbia, PA (US)

(73) Assignee: STMicroelectronics, Inc., Coppell, TX (US)

( * ) Notice: Subject to any disclaimer, the term of this patent is extended or adjusted under 35 U.S.C. 154(b) by 2924 days.

(21) Appl. No.: 10/455,097

(22) Filed: Jun. 5, 2003

(65) Prior Publication Data

US 2004/0246529 A1 Dec. 9, 2004

(51) Int. Cl.
*G06K 19/06* (2006.01)
*G06K 7/12* (2006.01)
*G06K 5/00* (2006.01)

(52) U.S. Cl. ........ 358/1.9; 358/3.28; 358/2.1; 358/3.06; 382/233; 382/237

(58) Field of Classification Search ................... 358/1.9, 358/3.28, 2.1, 3.06; 382/233, 235, 237
See application file for complete search history.

(56) References Cited

U.S. PATENT DOCUMENTS

| | | | |
|---|---|---|---|
| 5,118,369 A | 6/1992 | Shamir | |
| 5,122,911 A | 6/1992 | Kuo | |
| 5,243,655 A | 9/1993 | Wang | |
| 5,369,261 A | 11/1994 | Shamir | |
| 5,818,032 A | 10/1998 | Sun et al. | |
| 6,078,557 A | 6/2000 | Pierson | |
| 6,398,117 B1 | 6/2002 | Oakeson et al. | |
| 6,407,830 B1 | 6/2002 | Keithley et al. | |
| 6,533,168 B1 | 3/2003 | Ching | |
| 6,665,094 B1 * | 12/2003 | Lapstun | 358/1.9 |
| 6,731,409 B2 * | 5/2004 | Wang | 358/3.28 |
| 6,829,063 B1 * | 12/2004 | Allebach et al. | 358/3.13 |
| 2002/0085644 A1 * | 7/2002 | Hayami et al. | 375/271 |

OTHER PUBLICATIONS

"2D Superscript," [online] [retrieved on Apr. 3, 2003]. Retrieved from the Internet URL http://www.datastrip.com/english/print.asp?Id=90.
Paul J. Davey, et al. "Two-Dimensional Coding for a Multi-Track Recording System to Combat Inter-Track Interference," IEEE Transactions on Magnetics, vol. 34, No. 4, Jul. 1998. pp. 1949-1951.
John Jones, "A Design for the Colored Two-dimensional Bar Code," Nov. 12, 1997, pp. 1-11.

* cited by examiner

*Primary Examiner* — David K Moore
*Assistant Examiner* — Quang N Vo
(74) *Attorney, Agent, or Firm* — William J. Kubida; Hogan Lovells US LLP

(57) ABSTRACT

A printed media product, such as a trading card, that has a substrate and an encoded data element applied to a surface of the substrate containing information. The encoded data element includes first, second, and third data layers with first, second, and third patterns of encoded, colored dots defined by a binary encoding scheme. The dots of the first, second, and third layers are different colors separately resolvable by a scanner with decoding software. The colors of the dots are cyan, yellow, and magenta, and the layers are printed so that the dots overlap. The binary encoding scheme includes a two dimensional run length limited code. The printed media product includes a graphics element that can be interpreted by a human user, and typically, the information encoded in the encoded data element layers is related to the information in the graphics element.

8 Claims, 3 Drawing Sheets

PRINTED MEDIA PRODUCTS INCLUDING DATA FILES PROVIDED IN MULTIPLE LAYERS OF ENCODED, COLORED DOTS

BACKGROUND OF THE INVENTION

1. Field of the Invention

The present invention relates generally to encoding digital data in printed media or materials, and more particularly, to trading cards and other printed media products that include graphics and text that is visible and understandable to a human user and that further include a data file including data, such as multi-media data, that is dot encoded. The dots are colored, such as cyan, yellow, and magenta, and are printed over the top of each other with each particular color representing a layer or plane of data, i.e., a subset of the encoded data file. A scanner with a decoding module can resolve each color separately, decode the set of dots in that layer or plane, and then combine the decoded data files into a single data file that can be further processed by a user application file, such as an audio or video output application.

2. Relevant Background

A recent and growing trend is the inclusion of binary or digital data on numerous products and objects, such as identification cards, grocery and other retail products, driver's licenses, and myriad other goods. Often, the data is encoded and printed in a symbol, such as a bar code, that can be readily printed with existing printer technology and then optically scanned by a fixed or hand held scanner that decodes the symbol to obtain the digital data. In other words, digital or binary data can be provided on a printed substrate or media rather than just on magnetic media such as floppy and hard disks and optical media such as compact disks. While bar codes contain a relatively small amount of information, encoding methods have been, and are continuing to be, developed that allow more and more information to be placed on printed substrates and products. As printing and scanning technologies and densities increase, there will be a significant increase in the demand for data files on a diverse range of printed media and that there will be a demand for the amount of information provided in such files to be much larger.

An example of relatively simple encoded data file is a barcode (or uniform product code (UPC) symbol) found on almost all retail products. Barcodes have been available for encoding data for over thirty years. A traditional one-dimensional bar code is a machine-readable code consisting of a series of bars and spaces printed in different ratios. Bar code symbologies are essentially alphabets in which different widths of bars and spaces are combined to form characters to encode data. However, traditional barcodes encode at most a couple of dozen digits. Rather than providing a complete set of useful information, the standard bar code when decoded by an optical scanner provides a key to a database containing detailed information that must be accessed on an ongoing basis.

Two dimensional ("2D") barcodes were developed as one method of encoding more useful data in a printed label or symbol. 2D barcodes can encode more information in less space than traditional barcodes by storing data along the length and the height of the barcode, i.e., in two directions or dimensions. In 2D barcodes, because the vertical redundancy is gone, techniques must be used to prevent misreads. Most two dimensional codes use check words to insure accurate reading. One well-known 2D barcode is the PDF417 barcode, which does not require an external database as the symbol includes all the related information in a portable data file. The widespread use of bar codes has resulted in the technology to create one-dimensional and 2β barcodes being well-developed and relatively inexpensive.

More recently, color has been used to allow data to be encoded. For example, colored bar arrays bearing encoded information are used for color-coding electrical and electronic resistors. In another example of the use of color in encoding data, U.S. Pat. No. 5,369,261 to Shamir describes a technique of representing encoded information in terms of a matrix of bar-like or dot-like regions that are encoded by variables of both color and intensity. The system provides color coded dots, bars or regions arranged to form super pixels in which each super pixel is defined by a series of minute areas, each having a distinct color within or without the visible spectrum, with each minute area having a predetermined intensity or shade of color much like conventional shades of gray. The use of color has provided some useful advances in encoding data but often has been utilized in a manner that significantly increases costs or adds to the complexity of the printing or the scanning equipment.

There remains a need for methods of encoding high-density, multi-media data on printed media or substrates. Preferably, such a method would be useful for encoding data in a manner that allows existing printer and scanner technology to be utilized but that provides a significant increase over existing encoding techniques in the volume of data that can be stored in the same amount of space. By using at existing printer and scanner technology, costs of implementing the data-encoding and decoding methods can be controlled.

SUMMARY OF THE INVENTION

The present invention addresses the above problems by providing a method, and corresponding systems and devices, of encoding data in multiple layers of colored dots that can be printed on a substrate, such as a trading card or other printed media product, and later read by an optical scanner with a decoding module. A variety of binary encoding techniques can be used with one embodiment utilizing a two-dimensional (2D) run-length (RLL) code along with non-return to zero inverted (NRZI) binary encoding to format and/or encode information from a data file into a printable encoded data element. The encoded data element includes two or more layers of colored dots that are arranged in a pattern representing a subset of the information based on the encoding technique. In one embodiment, three layers of colored dots (i.e., cyan, yellow, and magenta dots) in encoded patterns are used to take advantage of optical scanning technology that can separately resolve cyan, yellow, and magenta dots. Each layer of colored dots can be thought of as a data layer that can be printed in a single area of a substrate surface to allow three or more times the amount of data to be provided in a printed data element covering a particular surface area.

More particularly, in one embodiment of the invention a printed media product, such as a trading card or an audio or video label or insert, is provided that has a substrate and an encoded data element applied to a surface of the substrate and containing a set of information. The encoded data element includes a first data layer, a second data layer, and a third data layer in first, second, and third data encoded dot patterns defined by a binary encoding scheme. The dots of the first, second, and third layers are colored different colors that can be resolved separately by a machine such as an optical scanner with proper decoding software. In one embodiment, the colors of the dots are cyan, yellow, and magenta and the layers are printed such that the second layer dots may cover dots in the first layer and the third layer dots may cover dots in both the first and second layers with the differing colors allowing a separate resolution by an optical scanner. In one embodiment, the binary encoding scheme includes a 2D RLL code, and typically includes NRZI binary encoding. The printed media product generally includes a graphics and/or text element that can be interpreted by a human user, and in typical embodiments, the set of information encoded in the encoded data element layers is related directly to the information in the graphics/text element, e.g., a song clip of a music group shown in the graphics/text element, a video clip of a performer shown in the graphics/text element, product information for a product shown in the graphics/text element, and the like.

According to another aspect of the invention, a method is provided for producing a high-density data element that can be printed on a substrate and then later read by a scanning device. The method includes receiving or providing a data file of information (such as an audio clip, a video clip, and the like) and dividing the information into first, second, and third data sets. The method continues with encoding the first, second, and third data sets according to a binary encoding scheme, such as using NRZI binary encoding and a 2D RLL code. First, second, and third colors are assigned to each of the encoded data sets with each color differing and in one embodiment being selected from cyan, yellow, and magenta. The method then continues with printing dots having the first color in a first layer on a substrate surface in a pattern defined by the encoded first data set. Second and third printing are performed to print dots having the second color in a second layer over the first layer in a pattern defined by the encoded second data set and to print dots having the third color in a third layer over the second layer in a pattern defined by the encoded third data set. The three printing steps may further include printing four alignment targets at corners of the printed dots in the first, second, and third layers and inserting a set of error correction code into the dot patterns and horizontal and vertical synchronization patterns into the dot patterns to enhance the reliability and accuracy of later reading and decoding processes performed on the encoded data element produced by the printing steps.

DETAILED DESCRIPTION OF THE PREFERRED EMBODIMENTS

The present invention is directed to an improved method of encoding data in a series or set of dots with a printer to provide a significant increase in the volume of data that can be stored but yet allowing existing scanners to resolve the dots and with a decoding module or application to decode the encoded information into one or more data files for further processing or use. In one embodiment, a trading card is produced according to the methods of the present invention and includes a substrate (such as a plastic, cardboard, or other material), a visual portion or element printed or provided on the substrate that includes graphics or a photograph and text describing a famous personality or group (e.g., a rock star, an athlete, a movie star, and the like), and further includes on the same or flip side of the substrate a compressed data file or data file element. The data element includes two or more sets of dots that are layered, are of differing colors (such as cyan, yellow, and magenta), and that are encoded according to a selected encoding technique (such as a high density two dimensional (2D) method). The information in the data element typically will correspond to the graphics/text element on the card, e.g., a video clip, a song or portion of a song, and the like. A color printer with an encoding module or software is used to print the encoded dots, with different colored dots being placed on top of each other in planes or layers, and a scanner with a decoding module or software (corresponding to the encoding module) is used to separately resolve the information provided in the layers of colored dots and combine the decoded binary (e.g., 0s and 1s) into a digital data for further processing or use by a user application (such as a graphics program, a video player, an audio player, and the like).

Figure 1:
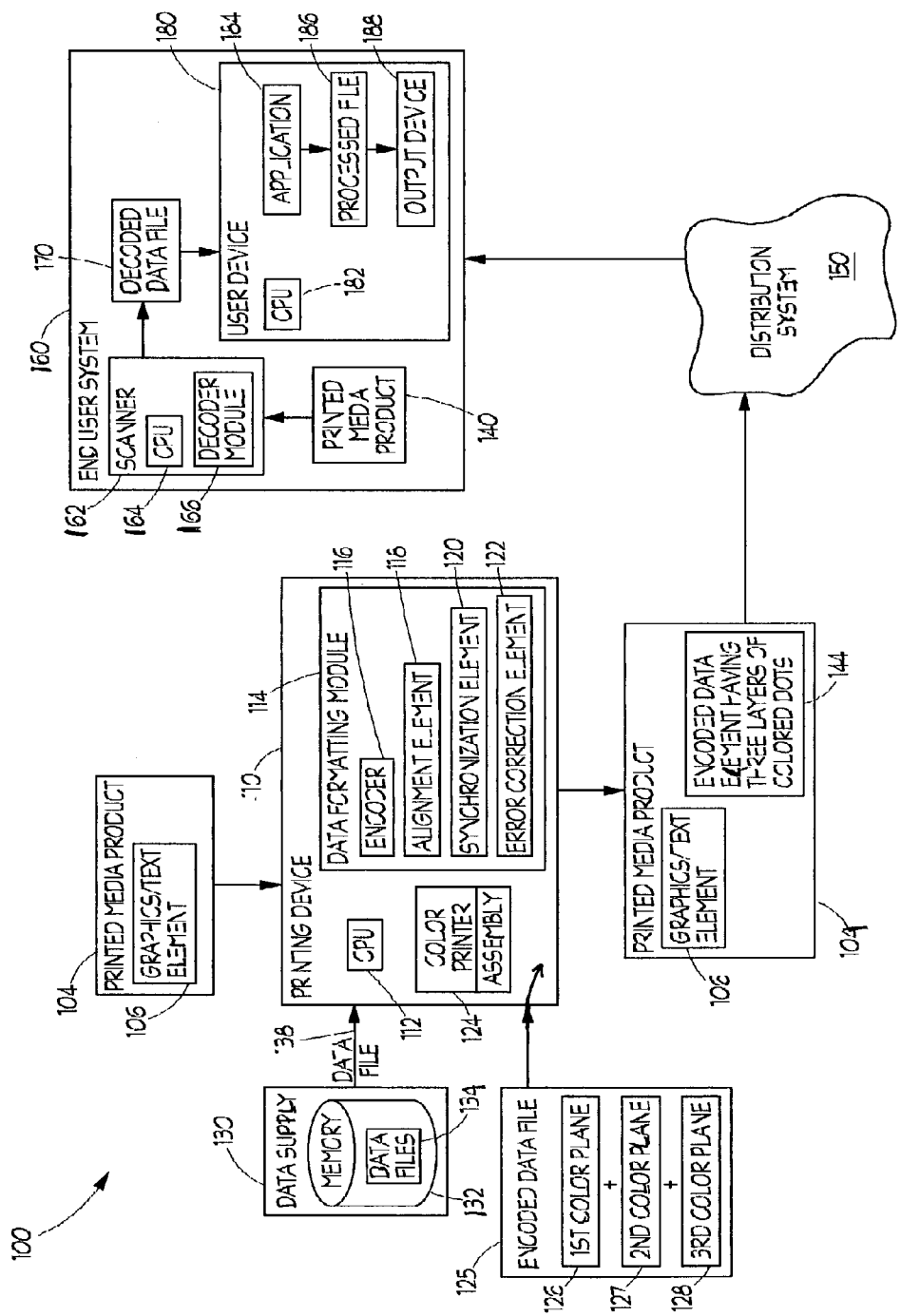
FIG. 1 is a simplified block diagram of a system for printing or producing media products with encoded data files, for distributing such media products, and for processing the media products to decode the data files and use the contained information.

With reference to FIG. 1, the following description begins with a general overview of one exemplary system for producing printed media products (such as trading cards, CD inserts, and the like) including an encoded data element with multiple planes or layers of data, for distributing the media products, and using or reading the distributed media products. Then, with reference to FIGS. 2-4, the description proceeds with a detailed description of trading cards produced according to the invention as one useful example of how the encoded data elements may be incorporated in nearly any product that includes a substrate for displaying a printed data element and that lends itself to scanning (which is many shapes and surfaces with the increased use of handheld scanners). FIG. 5 is provided to, at least in a simplified fashion, enable the description of one useful format or arrangement of components of one layer of data in a data element of the invention. The methods of encoding data in a data layer and of then later reading and decoding the encoded data in colored dots are discussed where appropriate with reference to FIGS. 1, 4, and 5.

FIG. 1 illustrates one embodiment of a dot encoding system 100 according to the invention. As shown, printed media products 104 with graphic/text elements 106 are produced in the system 100 or input to the system 100 from another system (not shown). The printed media products 104 may be nearly any product that includes surfaces or substrates upon which printing can be performed directly or upon which a printed label or substrate could be attached (such as in embodiments where the encoded data element 144 is printed independently on a label or substrate that can be affixed to the media product). Examples cannot be exhaustive but may include trading cards, music CD inserts, DVD inserts, audio or video tape packages, packaging or labeling for retail products (e.g., cardboard packages), plastic products including graphics and/or print, and many more. In one set of useful examples, the printed media products 104 are trading cards that include a graphics/text element 106 such as a picture of music group or performer and textual information such as the name of the group or performer and other information. The product 104 includes a paper-based substrate, such as cardboard, and the graphics/text element 106 is usually printed or provided on a first or front side. Other examples that might be provided as the product 104 include a music CD insert that shows a graphical design and/or a picture of the group at 106 and further includes textual information (such as titles of songs, words to the songs, and more information regarding the group or performer).

The printed media products 104 are provided to a printing device or system 110 for further processing. The printing device 110 functions to receive the media product 104, to receive an input data file or set of information 138, to encode the information 138, and to print a encoded data element 144 onto the media product 104. To perform these tasks, the printing device 110 includes a processor or CPU 112, a color printer assembly 124, a data formatting module 114, and memory for at least temporarily storing the encoded data file 125 prior to it being printed in layers by the printer assembly 124 on the received media product 104.

The data file or information 138 for use with the media product 104 is provided by a data supply 130, such as via the Internet or other electronic transmission media, by transfer on a magnetic storage device, or even in print or other form. The data supply 130 includes memory 132 for storing a number of data files 134. In the music trading card example, the data files 134 may be singles or songs recorded by the groups or artists whose photograph is included in the graphics/text element 106 of a product 104. The data file 138 then would be a music single that can be compressed to fit into an encoded data element 144 on a finished printed media product 140. This is a useful example with present technologies as most music singles can be compressed using current compression techniques to obtain good audio quality even on the lower density card or product 104. The data 144 can then be read in the end user system 160 using typical personal computing devices using a color scanner or a standalone reader 162. The data file 138 instead could be a short clip of a movie in a movie trading card example, a short video clip showing an athlete in action for a sports trading card example, or audio or video clips for CD, DVD, or other inserts. Role-playing games can be enhanced with cards produced according to the invention with a data file 138 pertaining to a character that could provide much more information than is practical with simple text printing. In the role playing game, the data file 138 could be used by a computer to provide details of the game such as a player or character "skin" or appearance.

The printing device 110 receives the data file 138 and passes the information for formatting by the module 114. In other embodiments, the formatting and/or encoding can be performed by the data supply 130 or an intermediary device and does not have to be completed by the printing device 110 to practice the invention. The formatting module 114 functions to process the data file 138 for printing as layers of encoded dots on the media product 104. The formatting module 114 preferably completes the formatting in a manner that ensures good data compression and that allows for accurate readout or decoding by a scanner. To this end, the formatting module 114 includes an encoder 116, an alignment element 118, a synchronization element 120, and an error correction element 122. Each of these components can be altered and replaced without, necessarily, requiring modification or replacement of the other components. These components work together to process the data file 138 into the encoded data file 125 for printing on the media product 104. The data in the file 138 is generally encoded using techniques similar to those used in optical data storage with additional considerations for the limitations of scanning resolution and of unreliability of the storage medium. The functioning of the alignment, synchronization, and error correction elements are discussed in detail with reference to FIG. 5, but it is useful at this point in the description to discuss encoding of the data file 138 by the encoder 116 to create the encoded data file 125.

According to an important aspect of the invention, information in the data file 138 is stored in separate layers of colored dots encoded in a selected format for later scanning and decoding. For example, existing scanners, such as scanner 162, are able to resolve separately cyan, yellow, and magenta dots even when the dots are printed so as to overlap and even completely cover each other. The inventive methods of the invention take advantage of this scanner capability by storing the data file 138 in subsets of data in layers or planes of colored dots. Typically, at least two layers are used, the dots being cyan and yellow, cyan and magenta, or yellow and magenta. To more fully use the resolution capabilities of color scanners, three layers of colored dots are encoded with the information from the data file 138 with one layer being yellow, one magenta, and one cyan. In this embodiment, the data from the file 138 is stored as separate CYM color planes that can be thought of as 3 independent layers of "optical recording." Hence, the encoder 116 acts to divide the volume of information into three sets and then creates the encoded data file 125 by encoding each set of information into a binary encoded set of dots for the first color plane 126 (such as cyan), the second color plane 127 (such as yellow), and the third color plane 128 (such as magenta). Typically, the sets 126, 127, 128 are created as simple serial divisions in the set of data 138 but this is not required as long as the decoder module 166 understands the relation between the subsets of data in the layers or planes 126, 127, 128. Further, there is no requirement that the same amount of information be encoded in each layer 126, 127, 128 although dividing the file 138 into three (or other number of layers) subsets for encoding in each color plane 126, 127, 128 is one preferred embodiment of the encoder 116.

As discussed, the data in each plane 126, 127, 128 is encoded binary data that is formatted and/or encoded according to a selected encoding/formatting scheme (or, in some cases, it may be desirable to use differing schemes for one or more of the layers or planes 126, 127, 128 such as to provide an added level of security). In one embodiment, data within a given color plane 126, 127, 128 is formatted using the non-return to zero inverted (NRZI) data encoding format, in which a one is represented as a change in state of a color being present or not present. These transitions are used to synchronize the virtual clock of the data separator. Continuous runs of color state present or not for a full dot distance are zeros. In other embodiments, differing binary encoding schemes are successfully used.

The particular encoding method or scheme selected is not limiting to the invention but preferably is selected to allow for scanning resolutions and unreliability of storage medium with the use of printed media. One useful coding scheme type is the run-length limited (RLL) codes that have been applied to optical storage and more preferably a two-dimensional (2D) RLL code is implemented by the encoder 116 to create the encoded files 126, 127, 128 for the 3 color planes. 2D RLL codes are useful for ensuring that there are enough transitions properly spaced throughout the data represented by the printed colored dots. Exact parameters for minimum and maximum run lengths may vary significantly and will be set based on evaluating error parameters of printed dots on a particular substrate or media product 104 with an expected scanner 162 (or various scanners to provide a larger breadth of useful service).

In an even more specific example of the encoder 116, a 2D RLL (0,2) code is used to create the encoded data file 125. With the 2D RLL (0,2) code the 2D RLL encoding overhead can be estimated. For a 5 by 5 dot pattern, there are 281,000 code patterns that fit the RLL (0,2) rules in both dimensions. This translates to a 18 to 25 overhead or a ratio of 18 bits/(5*5) which results in a 0.72 RLL (0,2,0,2) encoding overhead. In order to reduce interference analogous to inter-track interference (ITI) a 4 bit to 2 by 3 2D RLL code (with an overhead of 0.66) may be utilized. This 2D RLL code is useful in the present invention because it does not have transitions on adjacent "tracks" that reduces ITI and improves channel accuracy. For further explanation of this code see *Two Dimensional Coding for a Multi-Track Recording System to Combat Inter-Track Interference*, Davey et al., IEEE Transactions on Magnetics, Vol. 34, No. 4, pp. 1949-51, July 1998, which is incorporated herein in its entirety by reference. In another 2D RLL encoding embodiment of the invention, a 4 "track" 2D RLL (1,3) is utilized by the encoder 116. This code is described in *Two Dimensional Coding for a Multiple-Track, Maximum-Likelihood Digital Magnetic Storage System*, Davey et al., IEEE Transactions on Magnetics, Vol. 30, No. 6, pp. 4212-14, November 1994 which is incorporated herein in its entirety by reference. This 2D RLL (1,3) code uses the technique of relaxing RLL constraint parameters along a single track. Transitions on neighboring tracks can be used to maintain clock synchronization and reduce code size. A reverse enumeration scheme can be used that, too, that is based on the trellis description of the (d, k) constraint for a channel employing extended class IV partial response signaling and maximum likelihood detection.

Other encoding schemes or techniques that are implemented in some embodiments of the encoder 116 two encode binary data using dots include 2D bar codes (which are well know in the art and not explained in detail here). In this embodiment, each color plane 126, 127, 128 includes a set of the data from the file 138 that is encoded in one or more 2D barcodes that are then printed over the top of each other by the printer 124. Other techniques for encoding by the encoder 116 include the Aztec code, the small Aztec code, Codblock, Code 1, Code 16K, Code 49, CP Code (a proprietary code developed by CP Tron, Inc.), DataGlyph (a proprietary code developed by Xerox PARC), Data Matrix (by Acuity CiMatrix), Datastrip Code (by Datastrip, Inc.), Dot Code A, PDF417 (by Symbol Technologies), Micro PDF417, QR Code (by Nippondenso ID Systems), SuperCode, Ultracode (by Zebra Technologies), and other encoding techniques useful for binary encoding with dots.

Once the data file 138 is encoded in the encoded data file 125, the color printer assembly 124 functions to print the first, second, and third color planes 126, 127, and 128 onto the received media product 104 to create the printed media product 140. The printed media product 140 includes the encoded data element 144 having three layers of colored dots (e.g., cyan, yellow, and magenta). The printer assembly 124 may include numerous varieties of well-known printers or printer technologies that are useful for achieving a desired print density. Current standard commercial printing techniques that may be used in the color printing assembly are able to achieve 2350 dots per inch (dpi). Typically, a scanner, such as scanner 162, is then required to read twice ("2×") the print resolution to be effective. Many scanners can presently support 4800 dpi color scanning that can read the required 2× of high end printers. However, 4800 dpi scanners may be more expensive than desired, and so, it may be useful that the color printer assembly utilize a lower printing resolution, e.g., a reduction of 25 to 50 percent from 2350 dpi, to support available less expensive scanner resolutions. The type of printer is not limiting of the invention as long as it is able to print 2 or more colors and print the encoded data element 144 as indicated in the color planes 126, 127, 128 of the encoded data file 125.

As discussed above, the printed media product 140 may take many forms, such as trading cards, retail product packaging, ID cards, music or video inserts or packaging, and many more forms too numerous to list. Preferably, the graphics/text element 106 and information in the encoded data element 144 are related, such as a song or movie clip in element 144 for a performer shown in element 106 in the trading card embodiment or biographical information in element 144 for a person described in element 106 for an ID embodiment. The positioning of the elements 106 and 144 is not important to the invention with the elements being on a single surface in some cases while more typically, each element 106, 144 will be on a different surface for each of production and scanning.

Figure 2:
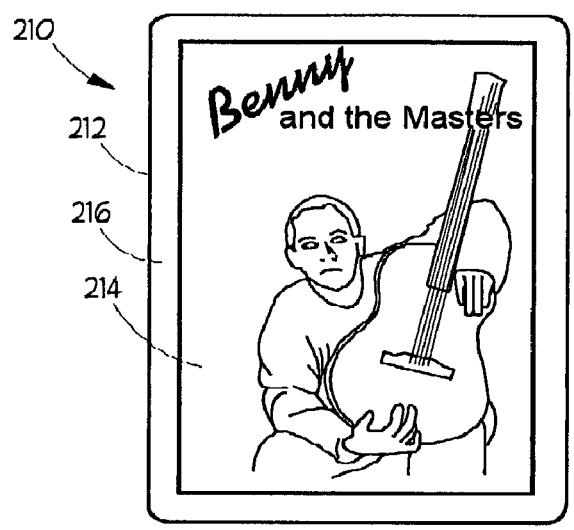
FIG. 2 illustrates the front side of a trading card produced according to the invention.
Figure 3:
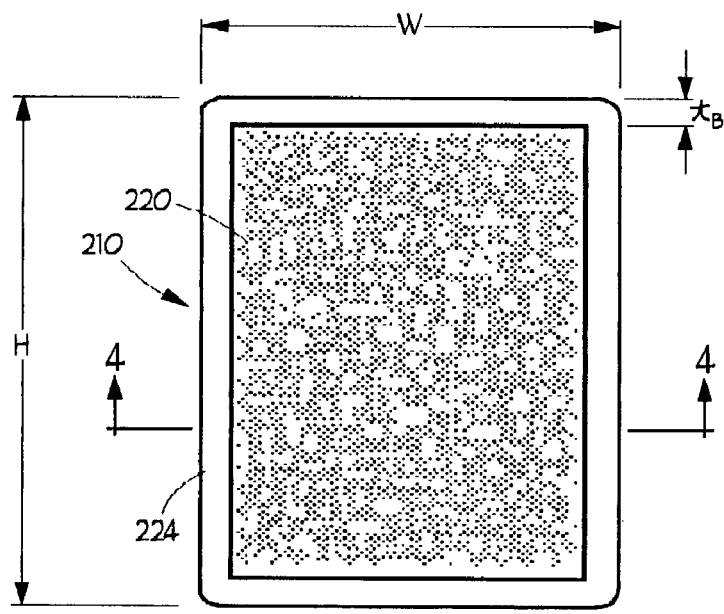
FIG. 3 illustrates the back side of the trading card of FIG. 2 showing an encoded data element that has been printed on the back side or surface of the substrate of the card.
Figure 4:
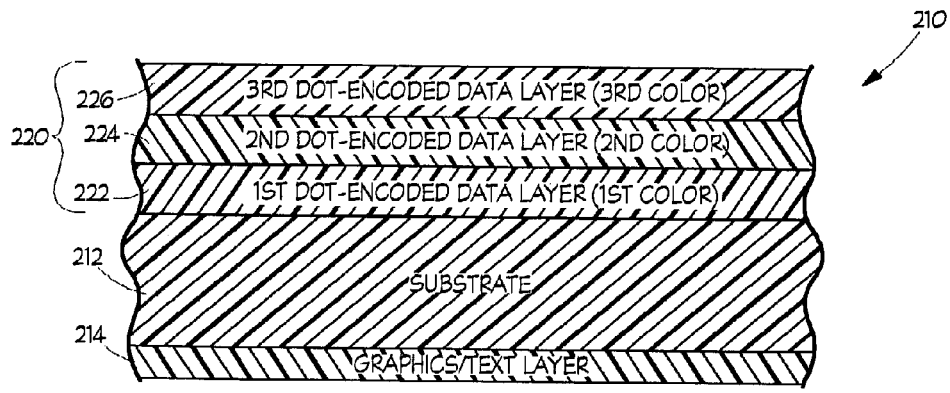
FIG. 4 is a cross sectional view of the device of FIG. 3 taken at line 4-4 shown with the printed layers significantly enlarged or thickened to better illustrate the use of multiple, distinct layers of dot-encoded data made up of differently colored dots.
Figure 5:
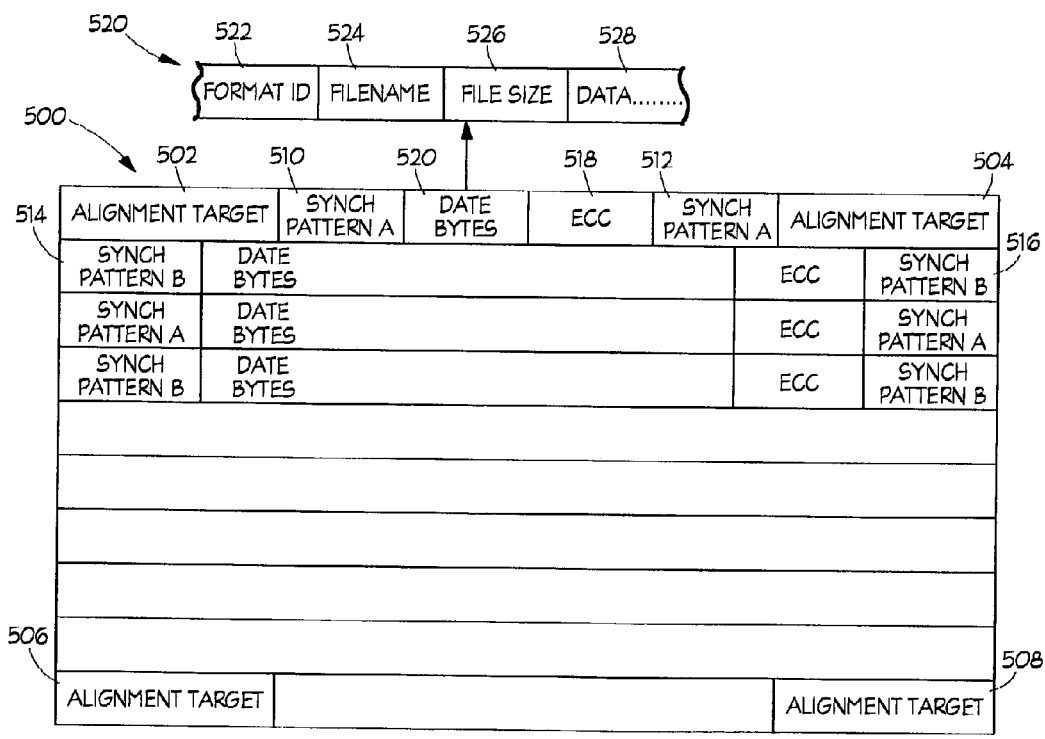
FIG. 5 illustrates one embodiment of one layer of an encoded data element of the invention showing in a simplified fashion one format that can be utilized to encode data in layer or plane of colored dots.

FIGS. 2-4 illustrate one embodiment of the media product 140 that may be produced, distributed, and read or used according to the invention. As shown in FIGS. 2-4, a trading card 210 includes a substrate (e.g., a cardboard or paper-based or plastic layer of material) upon which a graphics/element 214 is placed allowing for a border 216. The illustrated example is of a music trading card 210 with a photograph or graphical depiction of a music group along with their name provided in element 214 on the front or first side of the substrate 212. FIG. 3 illustrates the second or backside of the substrate 212 that includes a border 212 and an encoded data element 220 (which shows a simplified pattern of dots representing 2 or more layers of colored dots).

The card 210 may have a size of a standard trading card with a width, W, of 2.625 inches and a height, H, of 3.625 inches (or some other useful dimensions). If a border 224 is provided with a thickness, $t_B$. The effective printing area for the element 220 is about 8.75 square inches. Using three layers or planes of encoded information at 2350 dpi printing resolution provides space for encoding 10 Mbytes of data. If reductions are made for scanning resolutions, the amount of data may be about 5 Mbytes to 7.5 Mbytes (less overhead space/bytes used to increase data reliability) with the total raw number of dots available in 3 color planes being over 140,000,000.

While 2 color planes may be used, a preferred embodiment of the invention utilizes three color planes. Existing scanners 162 can resolve independently cyan, yellow, and magenta, and hence, in one embodiment of the invention, three color planes corresponding to cyan, yellow, and magenta are used (arranged in any order). This is illustrated for the card 210 in FIG. 4 which shows the substrate 212 having the graphics/text layer or element 214 on one side of the substrate 212 and having the encoded data element 220 printed on a second or opposite side of the substrate 212. As shown, the encoded data element 220 includes a first dot-encoded data layer 222, a second dot-encoded data layer 224, and a third dot-encoded data layer 226 that correspond to a particular color (i.e., cyan, yellow, and magenta). In each layer 222, 224, 226, the dots are encoded to represent a subset of a data file (or, in some embodiment, multiple data files) such as data file 138 received by print device 110. Significantly, the card 210 with encoded data file 220 can store on a low cost print media three times as much data as is typically stored using the encoding of single color dots without the use of multiple layers or planes of colored dots.

Referring again to FIG. 1, the printed media product 140 is passed (typically in large number) from the printing device 110 to a distribution system 150. The distribution system 150 generally includes well-known wholesale and retail systems and will vary depending upon the particular form of the printed media product 140. The distribution system 150 functions to place the printed media product 140 in the hands of end users (such as trading card collectors, purchasers of music or video products, and the like). The end users in turn use their systems, such as system 160, to read and further process the information stored or encoded in the encoded data element 144.

The end user system 160 receives the printed media product 140 and includes devices for reading the product to decode the information in the encoded data element 144 and, typically, to further use the decoded information (e.g., play the song stored in the element 144). As shown, the system 160 includes a scanner 162 that function to read the encoded data element 144, and more particularly, may be any optical scanner that is able to adequately resolve the colored dots separately. The scanner 162 may be a fixed device, a card reader, a handheld device, or another useful scanner configuration. The resolution should further be 2× the resolution of the printer 124 to ensure proper reading of the dots. To perform decoding, the scanner 162 is shown to have a processor device or CPU 164 and a decoder module (e.g., decoding software) 166. To this end, the decoder module 166 is matched or paired with the data formatting module 114 so as to know (e.g., to allow decoding of binary data into a digital data file) the encoding techniques used by the encoder 116 as well as alignment, synchronization, and error correction features in the planes of the encoded data element 144 implemented by elements 118, 120, and 122.

Generally, the decoder module 166 functions to read each layer of the encoded data element and then combine the decoded information from each layer into a single decoded data file 170 (or a number of linked data files). For example, the decoder module 166 may produce a decoded data file 170 with a common extension for further processing, such as a zip, tgz, or tar file indicating the file may be broken down for further processing or such as a mp3, mpg, rm, rma, wma, wmv, jpg, and the like that are used to indicate various compressed audio, video, and image formats for the file 170. A number of other methods can be used within the invention to store and identify files and are considered within the breadth of the invention with the file type used for storing the data by the encoder being also known by the decoder.

The end user system 160 includes a user device 180 for further processing and/or using the decode data file 170. For example, the user device 180 may be a personal computing device for playing an audio file 170 or a player for playing a video file 170. As shown, the user device 180 includes a CPU or processor 182 and an application 184 for processing the file 170 to create (if necessary) a processed file 186 which is then used by the output device 188, e.g., to output a song compressed in the file 170, to show a video clip in the file 170, and the like.

The layers 126, 127, 128, 222, 224, 226 are typically formatted using the alignment element 118, synchronization element 120, and error correction element 122 of the data formatting module 114 to allow the dots to be converted into data (such as data in received file 138) reliably. A certain amount of "overhead" or lost storage capacity is incurred to increase the reliability and/or accuracy of the encoding and decoding processes. FIG. 5 illustrates one encoded data element layer 500 showing in very simple terms some of the features and formatting that may be used to enhance reliability and accuracy of dot-encoded data. As shown, alignment is enhanced by including with the alignment element 118 four alignment targets (such as square targets similar to those found on 2D barcodes) 502, 504, 506, 508 on all four corners of each layer or plane of an encoded data element, such as elements 144 and 220. These targets 502, 504, 506, 508 are printed by the printer 124 and allow the decoder 166 in the scanner 162 to correct for rotational skew and resolution differences between printing and scanning. Two targets can be used in some embodiments to calculate corrections by the decoder module 166 but four are preferred for redundancy because accurate rotation and scaling are critical for accurate data recovery by the scanner 162.

The synchronization element 120 of the data formatting module 114 is included to provide synchronization patterns or targets that allow the decoder module 166 to provide corrections in timing. In one embodiment, as shown in FIG. 5, horizontal and vertical synchronization is provided by synch patterns 510, 512, 514, 516 that alternate for each line (as shown with the A's and B's) on all four edges of the layer 500 of the encoded data elements 144, 220. These synch patterns 510, 512, 514, 516 are used by the decoder module 166 to fine-tune parameters for synchronization. The synch patterns 510, 512, 514, 516 also alternate between two patterns so that the decoder module 166 can accurately locate a starting point of a data track of dots. The overhead for an exemplary 5 dot synchronization pattern on all edges in all 3 color layers (and assuming a standard trading card size as discussed relative to FIGS. 2 and 3 and a printing resolution of 2350 dpi) results in 420,000 dots provided as an overhead for synchronization.

In some embodiments, an error correction scheme is implemented by the error correction element 122 as part of formatting the encoded data file 125 in each color layer 126, 127, 128 to facilitate the decoder module 166 functioning to reliably recover data from damaged media products and to allow for printer and scanner errors. The amount of error correction code (ECC) bits used in the layer 500 may vary with the media product (e.g., such as with various materials), with the encoding techniques used, with the printer type and resolution used, with the scanner type and resolution used, and based on other operating and use parameters. ECC bits 518 are shown included in each data sector per line of the element layer 500 as one useful example of how ECC may be included according to the invention. In one embodiment, the error correction element 122 functions based on techniques similar to DVD error correction that use Reed-Solomon Product Code (RSPC). In this embodiment, data is broken into a data sector per line with a few bytes of error correction code 518. Groups of sectors are scrambled and a number of RSPC parity inner and outer bits 518 are added to the data for error correction by the decoder module 166. DVDs currently use approximately 15 percent overhead to achieve a bit error rate of 1 in $10^{15}$. In the trading card embodiment of the invention, it may be useful to provide more ECC overhead to account for the higher probability of card or substrate damage and other factors, e.g., it may be useful to allow for ECC overhead of up to 20 percent or more depending on the application.

Referring again to FIG. 5, the encoded data element layer 500 also illustrates how data may be formatted in some embodiments of the invention by the data formatting module 114. In many cases for simplicity, only one file is stored on each printed media product (but it is understood that the invention is readily useful to products 144 with 2 or more encoded data elements 144). As shown, the data sector or bytes 520 contain a format identifier or ID 522 (such as 8 bits using ASCII) to indicate to the decoder module 166 the encoding format used to create the encoded data file 125 and used by the printer 124 in printing the dots in each layer of the encoded data element 144. The next portion of the data bytes

520 (such as the next 128 bytes) are used to contain the file name (or file names in some embodiments) of the file on the printed media product 140 and may, for example, be in the format like the Joliet extension of ISO9660, e.g., a maximum of 64 characters including Unicode character escape sequences as defined in Joliet. Following the filename 524 in this embodiment is the file size 522 which may, for example, be a 4-byte file size stored in little-indian or another format. The data 528 for the compressed file follows the file size 522.

The above disclosure sets forth a number of embodiments of the present invention. Other arrangements or embodiments, not precisely set forth, could be practiced under the teachings of the present invention and as set forth in the following claims.

We claim:

1. An apparatus for displaying information including a machine-readable, encoded data file containing a set of information, comprising:
    a substrate; and
    an encoded data element containing the set of information applied to the substrate, wherein the encoded data element comprises a first data layer including dots of a first color in a first pattern defined by a binary encoding scheme and a second data layer including dots of a second color differing from the first color in a second pattern defined by the binary encoding scheme, the first and second patterns of the dots of the first data layer and the second data layer being machine-readable to retrieve the set of information of the encoded data file, and
    wherein the encoding scheme comprises a two-dimensional run-length limited code defining the first and second patterns.

2. The apparatus of claim 1, wherein the first and second data layers are printed with the dots of the second data layer at least partially covering the dots of the first data layer.

3. The apparatus of claim 1, wherein the first and second colors are selected from the group of colors consisting of cyan, yellow, and magenta.

4. The apparatus of claim 1, wherein the encoded data element further includes a third data layer including dots of a third color differing from both the first and second colors in a third pattern defined by the binary encoding scheme, the third layer being printed over the first and second data layers with the dots of the third data layer at least partially covering the dots of the first and second data layers and first, second, and third colors being selected from the group of colors existing of cyan, yellow, and magenta.

5. The apparatus of claim 1, wherein the encoding scheme further comprises formatting the dots of the first and second data layers using non-return to zero inverted (NRZI) binary encoding.

6. The apparatus of claim 5, wherein the encoding scheme further includes providing in the first and second data layers a set of alignment targets, a pair of alternating synchronization patterns, and error correction code.

7. The apparatus of claim 1, further including a graphics element applied to the substrate, wherein the set of information in the encoded data file relates to the graphics element.

8. The apparatus of claim 7, wherein the substrate is a trading card substrate and wherein the graphics element is applied to a first side of the substrate and the encoded data element is applied to a second side of the substrate.

* * * * *